US012462674B2

(12) United States Patent
Pu et al.

(10) Patent No.: US 12,462,674 B2
(45) Date of Patent: Nov. 4, 2025

(54) MOBILE ROADWAY SENSING

(71) Applicant: University of Washington, Seattle, WA (US)

(72) Inventors: Ziyuan Pu, Seattle, WA (US); Ruimin Ke, Seattle, WA (US); Chenxi Liu, Seattle, WA (US); Hao Yang, Seattle, WA (US); Yinhai Wang, Seattle, WA (US)

(73) Assignee: University of Washington, Seattle, WA (US)

( * ) Notice: Subject to any disclaimer, the term of this patent is extended or adjusted under 35 U.S.C. 154(b) by 475 days.

(21) Appl. No.: 18/050,930

(22) Filed: Oct. 28, 2022

(65) Prior Publication Data

US 2023/0136925 A1    May 4, 2023

Related U.S. Application Data

(60) Provisional application No. 63/273,515, filed on Oct. 29, 2021.

(51) Int. Cl.
*G08G 1/01* (2006.01)
*G06V 20/54* (2022.01)
*G08G 1/04* (2006.01)
*G08G 1/0967* (2006.01)

(52) U.S. Cl.
CPC ........... *G08G 1/0116* (2013.01); *G06V 20/54* (2022.01); *G08G 1/04* (2013.01); *G08G 1/0967* (2013.01)

(58) Field of Classification Search
CPC ...... G08G 1/0116; G08G 1/04; G08G 1/0967; G06V 20/54

USPC ......................................................... 701/117
See application file for complete search history.

(56) References Cited

U.S. PATENT DOCUMENTS

| 11,372,936 B2* | 6/2022 | Ricci ..................... G06F 16/183 |
| 2010/0235285 A1* | 9/2010 | Hoffberg .............. G06Q 50/188 |
| | | 705/37 |
| 2010/0317420 A1* | 12/2010 | Hoffberg ............ G06Q 30/0282 |
| | | 463/1 |

OTHER PUBLICATIONS

Bewley et al., "Simple Online and Realtime Tracking", 2016 IEEE international conference on image processing (ICIP), Sep. 25, 2016, pp. 3464-3468.

(Continued)

*Primary Examiner* — Yazan A Soofi
(74) *Attorney, Agent, or Firm* — Kilpatrick Townsend & Stockton LLP

(57) ABSTRACT

A mobile roadway sensing unit can include an image sensor that can sense image data, a network sensor that can acquire wireless signal data, and a weather sensor that can sense weather condition data. The mobile roadway sensing unit can include a processor and a memory. The memory can include instructions executable by the processor for causing the processor to acquire the sensor data including at least one of the image data, the wireless signal data, or the weather condition data from the weather sensor, wherein the sensor data represents one or more current conditions proximate the mobile roadway sensing unit. The processor can generate processed data based on the sensor data The processor can generate, based on the processed data, a notification corresponding to the one or more current conditions. The processor can provide the notification to one or more external electronic devices.

20 Claims, 9 Drawing Sheets

(56) References Cited

OTHER PUBLICATIONS

Ke et al., "A Smart, Efficient, and Reliable Parking Surveillance System With Edge Artificial Intelligence on IoT Devices", IEEE Transactions on Intelligent Transportation Systems, vol. 22, No. 8, Apr. 8, 2020, pp. 4962-4974.
Ke et al., "Edge Computing for Real-Time Near-Crash Detection for Smart Transportation Applications", Institute of Electrical and Electronics Engineers, Aug. 2, 2020, pp. 1-11.
Luo et al., "MIO-TCD: A New Benchmark Dataset for Vehicle Classification and Localization", IEEE Transactions on Image Processing, vol. 27, No. 10, Oct. 2018, pp. 5129-5141.
Pu et al., "Monitoring Public Transit Ridership Flow by Passively Sensing Wi-Fi and Bluetooth Mobile Devices", IEEE Internet of Things Journal, vol. 8, No. 1, Jan. 1, 2021, pp. 474-486.
Pu et al., "Multimodal Traffic Speed Monitoring: A Real-time System Based on Passive Wi-Fi and Bluetooth Sensing Technology", IEEE Internet of Things Journal, vol. 9, No. 14, Jul. 15, 2022, pp. 12413-12424.
Zhou et al., "Edge Intelligence: Paving the Last Mile of Artificial Intelligence With Edge Computing", Proceedings of Institute of Electrical and Electronics Engineers, vol. 107, No. 8, Aug. 2019, pp. 1738-1762.

\* cited by examiner

MOBILE ROADWAY SENSING

CROSS-REFERENCES TO RELATED APPLICATIONS

This application claims the benefit of U.S. Provisional Application No. 63/273,515 filed Oct. 29, 2021, the entire contents of which are hereby incorporated for all purposes in their entirety.

STATEMENT AS TO RIGHTS TO INVENTIONS MADE UNDER FEDERALLY SPONSORED RESEARCH AND DEVELOPMENT

This invention was made with government support under Grant No. 69A3551747110, awarded by the U.S. Department of Transportation. The government has certain rights in the invention.

BACKGROUND

Sensors for monitoring roadway conditions have become more common in recent years. These sensors may be configured to monitor real-time traffic data, roadway surface condition data, and environmental condition data. Data from these sensors can be used to improve roadway safety conditions. For example, the data can be broadcast to road users (e.g., drivers) for enabling road users to make safe and informed choices on the road.

BRIEF SUMMARY

A mobile roadway sensing unit can include an image sensor that can sense image data, a network sensor that can acquire wireless signal data, and a weather sensor that can sense weather condition data. The mobile roadway sensing unit can include a processor and a memory. The memory can include instructions executable by the processor for causing the processor to acquire the sensor data including at least one of the image data, the wireless signal data, or the weather condition data from the weather sensor, wherein the sensor data represents one or more current conditions proximate the mobile roadway sensing unit. The processor can generate processed data based on the sensor data The processor can generate, based on the processed data, a notification corresponding to the one or more current conditions. The processor can provide the notification to one or more external electronic devices.

DETAILED DESCRIPTION

Figure 1:
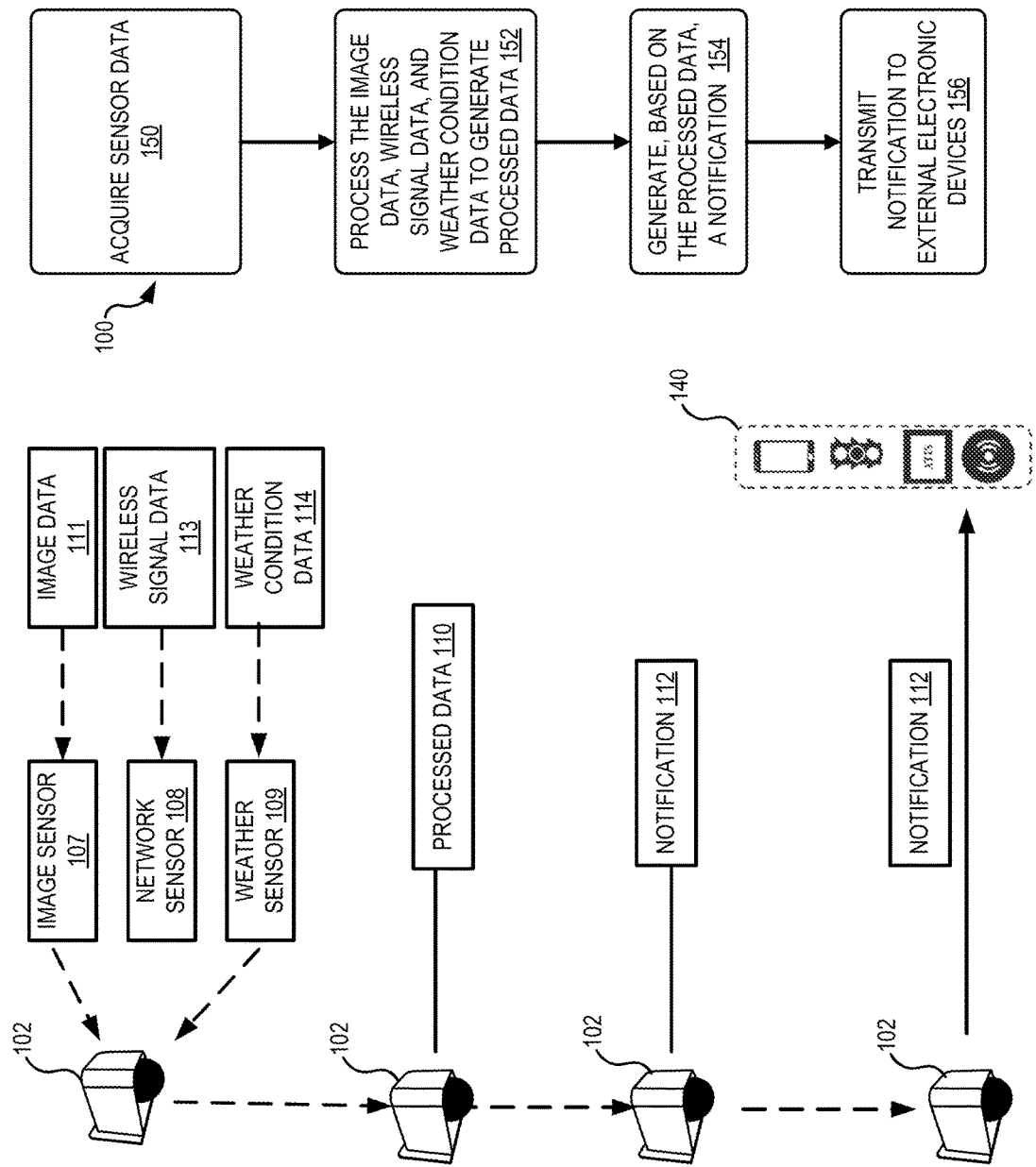
FIG. 1 illustrates an example block diagram showing a mobile roadway sensing unit and associated flowchart showing a process for implementing techniques relating to mobile roadway sensing, according to at least one example.

Embodiments described herein are directed to mobile roadway sensing units, systems that include one or more mobile roadway sensing units, and various techniques for collecting data using the mobile roadway sensing units, processing such data in real-time, and providing output data that is actionable by various systems and devices. Generally, a mobile roadway sensing unit can be an intelligent electronic device installed on the roadside for transportation data collection, analysis, and transmission. Mobile roadway sensing units can employ artificial intelligence to recognize vehicles, cyclists, pedestrian, and other transportation participants from images it gathers of the scene. In some embodiments, mobile roadway sensing units can form a real-time communication bridge between electronic devices associated with transportation participants (e.g., drivers, cyclists, and other road users) and electronic systems associated with transportation managers (e.g., transportation management suppliers and governmental bodies that may be responsible for managing transportation infrastructure). In some embodiments, mobile roadway sensing units can cooperate with traffic network infrastructures, such as traffic signal networks, for improving safety, efficiency, and energy spent in the transportation system.

The techniques described herein address various issues with conventional traffic data collection systems. For example, conventional traffic data collection systems may only support one specific type of data collection. For instance, a loop detector collects traffic volume and speed, surveillance camera records can collect video, and weather stations can detect weather conditions. However, the datasets collected from these different sensing products, which are obtained from systems normally installed at different locations, can introduce significant challenges for accurate and reliable fusion and analysis of the multi-source data with different formats, spatial-temporal characteristics, and operational approaches of their specific vendors. By contrast, the mobile roadway sensing unit described herein includes collects data from various onboard sensors and can process and integrate the data without needing to assimilate data in a variety of formats and from a variety of sources that may not be synchronized or accessible in real time.

Furthermore, some conventional traffic data collection systems lack real-time data processing capabilities. This is because the systems may transmit raw data to a backend server for processing. Even when the data is provided to the backend server, large amounts of raw data can present a significant burden to the backend server and can cause excessive consumption of computing resources and unnecessary network traffic. In some cases, much of the raw data can be irrelevant and may be discarded during post-processing. Furthermore, some data collection systems may not possess communication capabilities with road users, operations center, and traffic control devices. For instance, some sensing devices may not be able to transmit data to traffic operations center for traffic operations. By contrast, the mobile roadway sensing unit can remove unnecessary data prior to transmitting the data to a back-end server or a traffic operations sensor.

Turning now to a particular example, in this example, is provided a mobile roadway sensing unit. The mobile roadway sensing unit includes a variety of onboard sensors for collecting roadway data that may be relevant for traffic management purposes. For example, the mobile roadway sensing unit can be a single device that can be installed near a roadway. The mobile roadway sensing unit can include onboard computing capabilities for processing the roadway data collected by the onboard sensors. After processing, the mobile roadway sensing unit can generate a notification and transmit the notification to external electronic devices. Additionally, the mobile roadway sensing unit can transmit the processed data to a server for additional processing or use in managing traffic infrastructure.

Turning now to the figures, FIG. 1 illustrates an example block diagram showing a mobile roadway sensing unit 102 and associated flowchart showing a process 100 for implementing techniques relating to mobile roadway sensing, according to at least one example. FIG. 1 depicts an introduction to the subject matter, function and structure, of the mobile roadway sensing unit 102, according to at least one example. The process 100 may generally be performed by the mobile roadway sensing unit 102. The mobile roadway sensing unit 102 may be mounted proximate a roadway (e.g., intersection, onramp, freeway, etc.).

The process 100 begins at block 150 by the mobile roadway sensing unit 102 acquiring sensor data. The mobile roadway sensing unit 102 includes an image sensor 107 for collecting image data 111 (e.g., video data) of a scene surrounding the mobile roadway sensing unit 102 (e.g., the roadway proximate the mobile roadway sensing unit 102). The mobile roadway sensing unit 102 can also include a network sensor 108 for detecting wireless signal data 113 from connected electronic devices that may be communicatively couplable with the network sensor 108 through Wi-Fi, Bluetooth, or any other suitable wireless transmission methods. For example, the network sensor 108 can retrieve media access control (MAC) addresses from wireless signal data transmitted by the electronic devices 140. The electronic devices may include mobile devices, electronic devices in vehicles, and the like. The mobile roadway sensing unit 102 can also include a weather sensor 109 that can acquire weather condition data 114 that can reflect weather conditions that may be local to the roadway about which the mobile roadway sensing unit 102 may be positioned. The weather sensor 109 can include multiple sensor components for sensing weather condition data 114. For example, the weather sensor 109 can include a temperature sensor, a pressure sensor, a humidity sensor, and/or any other suitable sensor for obtaining weather condition data 114.

At block 152, the process 100 includes the mobile roadway sensing unit 102 processing the data acquired from the weather sensor 109, the network sensor 108, and the image sensor 107 to generate processed data 110. Generating the processed data 110 can involve omitting raw data that may not be desirable to transmit. For example, instead of transmitting raw images taken from the image sensor 107, the mobile roadway sensing unit 102 can generate feature vectors corresponding to the image data 111 and incorporate the feature vectors into the processed data 110 for transmission. Transmitting feature vectors instead of raw image data 111 can save space and network bandwidth, and can remove personal or identifying information (such as license plates, faces, etc.) that may otherwise present a security risk if transmitted to an external electronic device 140. In some examples, the mobile roadway sensing unit 102 can compress the processed data 110 via a compression algorithm prior to transmission in order to minimize an amount of storage space and network bandwidth required to receive the processed data 110.

At block 154, the process 100 includes the mobile roadway sensing unit 102 generating a notification 112 based on the processed data 110. The notification 112 can, for example, be an application programming interface request or call that can include useful information for its recipients. At block 156, the process 100 includes the mobile roadway sensing unit 102 transmitting the notification 112 to one or more external electronic devices 140. In some examples, the external electronic devices 140 can include a server. The server may be a transportation management system that can generate recommendations to alter components of traffic infrastructure based on the notification 112 from the mobile roadway sensing unit 102. In some examples, the notification 112 can be devoid of identifying information. In an illustrative example, the external electronic device 140 can include an embedded system on a vehicle. The embedded system can receive the notification 112 and can display a warning to a driver that may be driving the vehicle in order to enable the driver to make safer, more informed choices while on the road.

In some examples, the mobile roadway sensing unit 102 can communicate bi-directionally with the external electronic device 140. For example, subsequent to transmitting the notification 112 to the external electronic device 140, the mobile roadway sensing unit 102 can receive a response from the external electronic device 140. The mobile roadway sensing unit 102 can perform one or more operations based on the response.

Figure 2:
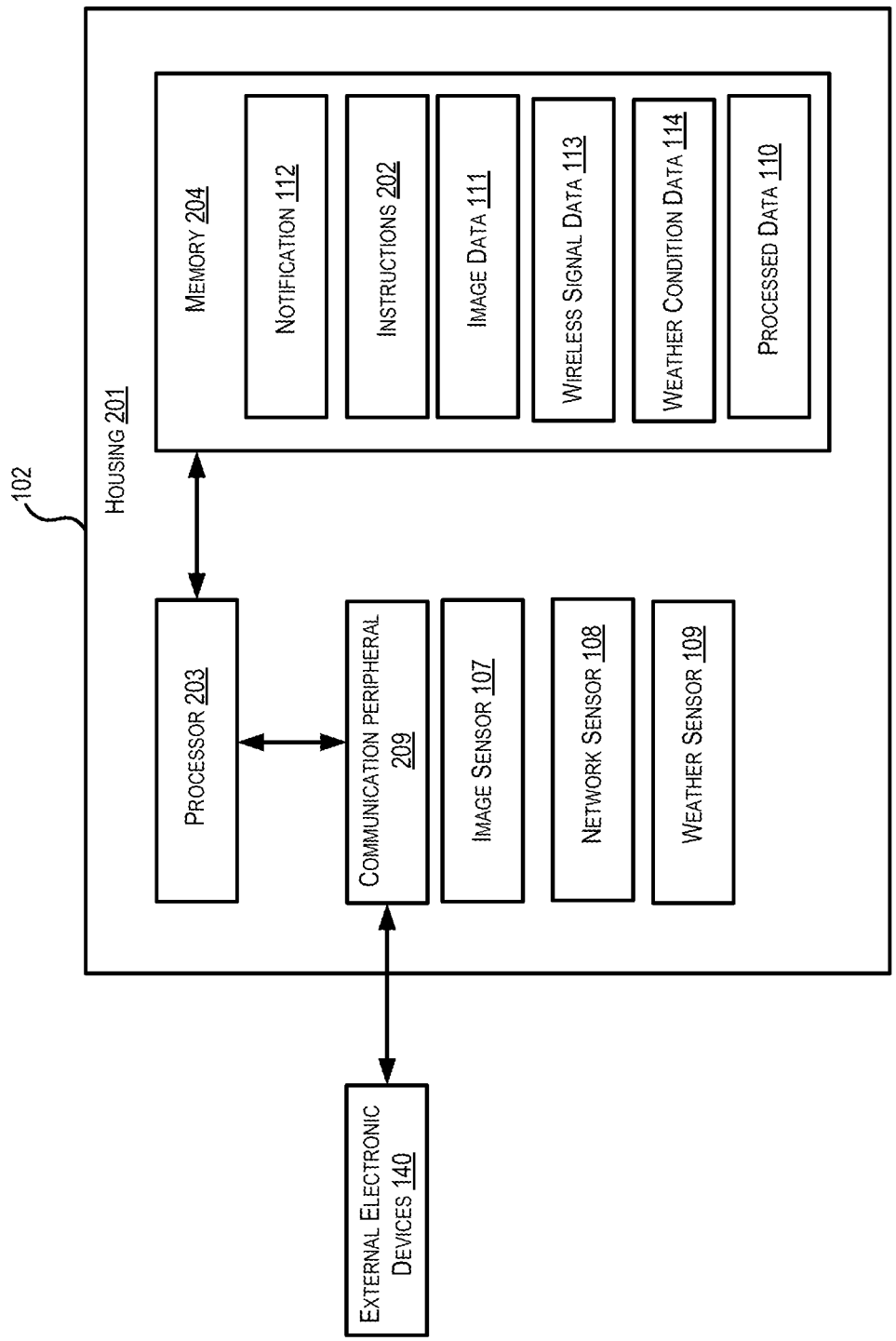
FIG. 2 illustrates a block diagram of a mobile roadway sensing unit, according to at least one example.

FIG. 2 illustrates a block diagram of a mobile roadway sensing unit 102 according to at least one example. The mobile roadway sensing unit 102 can include a processor 203 that can be communicatively coupled to a memory 204. The processor 203 can retrieve and execute instructions 202 from the memory 204. The instructions 202 can include applications, services, engines, programs, or any other suitable instructions 202 that are executable by a processor 203. The components of the mobile roadway sensing unit 102 can be housed within a housing 201. The housing 201 can shield the internal components of the mobile roadway sensing unit 102 (e.g., sensors and other electronic components) from the elements. The processor 203 can transmit data to a communication peripheral 209, such as an antenna or any other suitable transceiver. The communication peripheral 209 can transmit data wirelessly to external electronic devices 140 by Wi-Fi, Bluetooth, or any other wireless form of communication.

In some examples, the mobile roadway sensing unit 102 can process and combine data from one or more sensors (e.g., the image sensor 107, the network sensor 108, the weather sensor 109, or any other suitable sensors.) The resulting data can be stored in the memory 204 (e.g., the image data 111, the wireless signal data 113, and the weather condition data 114.) Integrating different data from different sensors can involve expending more computing resources. For example, data sets gathered from a variety of unrelated sensors can be represented in different data formats. Data gathered from only one sensor may not provide a comprehensive traffic scene sensing. Equipped with sensor fusion, mobile roadway sensing units 102 can enable a transportation agency to observe, model, and control traffic flow more effectively. Mobile roadway sensing units 102 can implement edge-based AI computing to generate processed data 110 based on the raw data obtained from their sensors. The mobile roadway sensing units 102 can address a number of issues associated with sensors that rely on external servers to process their raw data. Firstly, raw data can contain personal or identifying information which, if transmitted and intercepted, can result in a breach of privacy. Secondly, data transmission typically relies on internet connection. In some rural areas with low internet bandwidth, it can be hard to implement real-time sensing due to high internet delay. Thirdly, large volumes of data transmission can be very expensive. Finally, the large amount of raw data can cause unnecessary strain on a backend server receiving the raw data.

Raw data can contain private information which can be easily stolen if stored on-server during a cyber-attack. As a result, the edge-device can process the raw data and then send back the process results to the server without private information. Some data can be dropped from the system without any track. For example, the original video data collected by surveillance cameras can contain private information, such as a vehicle's license plate. An object detection algorithm can be implemented in an edge device, such as mobile roadway sensing units 102, to extract information from the data. For example, the object detection algorithm can extract a feature matrix of a vehicle represented in the data. Detailed private information in the data can be deleted prior to transmitting the feature matrix of the vehicle to a server. Finally, the feature matrices can be sent back to the server without the private information.

Mobile roadway sensing units 102 can perform edge computing methods that can involve processing data directly on mobile roadway sensing units 102 rather than via a backend server. In some examples, the edge computing methods may not require an internet connection to be performed. In some examples, mobile roadway sensing units 102 can process video data can be processed on mobile roadway sensing units 102. Mobile roadway sensing units 102 can, using the processed data 110, control transportation infrastructure to warn approaching/passing vehicles of adverse traffic conditions, such as an accident. For example, mobile roadway sensing units 102 can control traffic lights and road signs, and can transmit messages to road users in vehicles via 'vehicle-to-anything' (V2X) connectivity.

Large volumes of wireless data transmission can be very expensive. In order to prevent large quantities of wireless data transmission, the mobile roadway sensing unit can process raw data received from its sensors as an edge computing device. Mobile roadway sensing units 102 can process and extract pertinent data from the raw data and transmit the pertinent data to a backend server for use, storage, and/or further processing. Transmitting only the pertinent data rather than the raw data can enable road users to maintain privacy of information, and can reduce a data volume associated with mobile roadway sensing units 102. As an illustrative example, the size of an image frame captured by camera can be about 1 MB, while the processed feature matrices of the image can be roughly 300 KB. After removing some redundant information and private information, the size of single image feature matrix can be compressed to about 200 KB. As a result, mobile roadway sensing units 102 can operate with improved communication bandwidth requirements and data storage requirements. The feature matrices can include the significant information for research or projects, and can be much smaller than the raw data. Replacing the raw data with the pertinent data, for example, as extracted/compressed feature data, can prevent unnecessary usage of bandwidth and storage space.

The mobile roadway sensing unit can engage in two-way communication with road users, communication centers, traffic control devices, and larger scale traffic management personnel/systems to enable better data-based decision making. The mobile roadway sensing unit can make use of multiple sensors, including media access control (MAC) address detector via Wi-Fi and Bluetooth signals, one or more video cameras, one or more temperature sensors, one or more humidity sensors, or any other suitable sensors for acquiring data. The mobile roadway sensing unit 102 can process and integrate the raw data from multiple sensors before transmitting processed data to a target destination, such as an external electronic device 140. The mobile roadway sensing unit 102 can collect real-time transportation related data. For example, the image sensor 107 and the network sensor 108 can collect data on vehicle travel time, vehicle speed, traffic volume, vehicle types, and pedestrian flow. The weather sensor 109 can collect data on roadway surface conditions (wet, dry, snow-covered, or ice-covered), weather conditions (temperature and humidity), visibility, etc. The mobile roadway sensing unit can operate under challenging weather conditions (−40 F to 158 F) and environmental conditions. Taking advantage of edge AI technology, the mobile roadway sensing unit 102 can detect moving objects without requiring high bandwidth communication support. In addition, the mobile roadway sensing unit can be configured as a communication node as a road-side unit for connected vehicle and other smart transportation applications. The mobile roadway sensing unit 102 is capable of monitoring road traffic and pavement conditions and communicating with road users for safety warnings.

Figure 3:
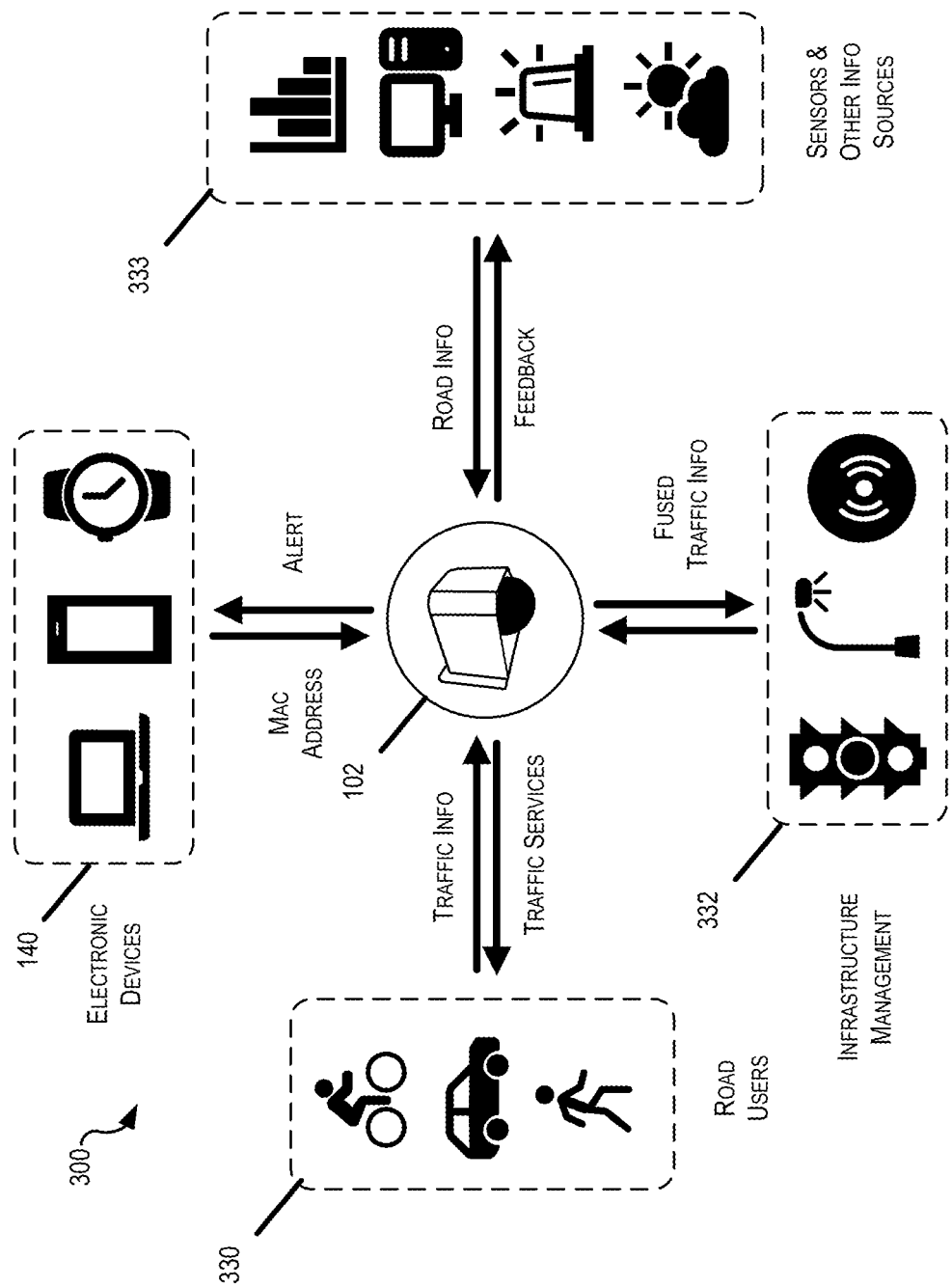
FIG. 3 illustrates a traffic network in which a mobile roadway sensing unit can be implemented, according to at least one example.

FIG. 3 illustrates a traffic network 300 in which a mobile roadway sensing unit 102 can be implemented according to at least one example. The mobile roadway sensing unit 102 can be wirelessly communicatively coupled with nearby electronic devices 140. The nearby electronic devices 140 can include, but are not limited to, cell phones, smart watches, laptops, vehicle electronics, or any other suitable electronic devices 140. The network sensor 108 can determine, for each electronic device 140, a MAC address that identifies the electronic device 140. Using the MAC addresses of the electronic devices 140, the mobile roadway sensing unit 102 can estimate a number of nearby road users within a certain range of the mobile roadway sensing unit 102. The mobile roadway sensing unit 102 can further estimate a number of pedestrians, drivers, and cyclists using the road based on image data 111 obtained form the image sensor. Furthermore, the mobile roadway sensing unit 102 can transmit an alert or notification 112 to electronic devices 140 that may be received or interpreted by road users 330. In some examples, the mobile roadway sensing unit 102 can receive voluntary reports or other traffic info from road users 330.

In some examples, the mobile roadway sensing unit 102 can transmit processed data 110 to an infrastructure management system 332. The infrastructure management system 302 can include a server that is configured to receive the processed data 110 from the mobile roadway sensing unit 102 and generate, based on the processed data 110, a recommendation to adjust elements of traffic infrastructure. For example, the infrastructure management system 332 can adjust traffic lights, road signs, streetlights, or any other suitable elements of traffic infrastructure that may be pertinent to the road or roads that may be adjacent to the road.

In some examples, the mobile roadway sensing unit 102 can be communicatively coupled to sensors and other information sources 333. For example, the mobile roadway sensing unit 102 can transmit application programming interface (API) requests for information from a weather server to receive external weather data. The mobile roadway sensing unit 102 can use the external weather data to calibrate itself, or, as a temporary substitute for the weather condition data 114 in the event that the weather sensor 109 is non-operational or is incapable of measuring certain weather parameters. In some examples, the mobile roadway sensing unit can generate the processed data 110 based in part on the external weather data in addition to the weather condition data 114.

Figure 4:
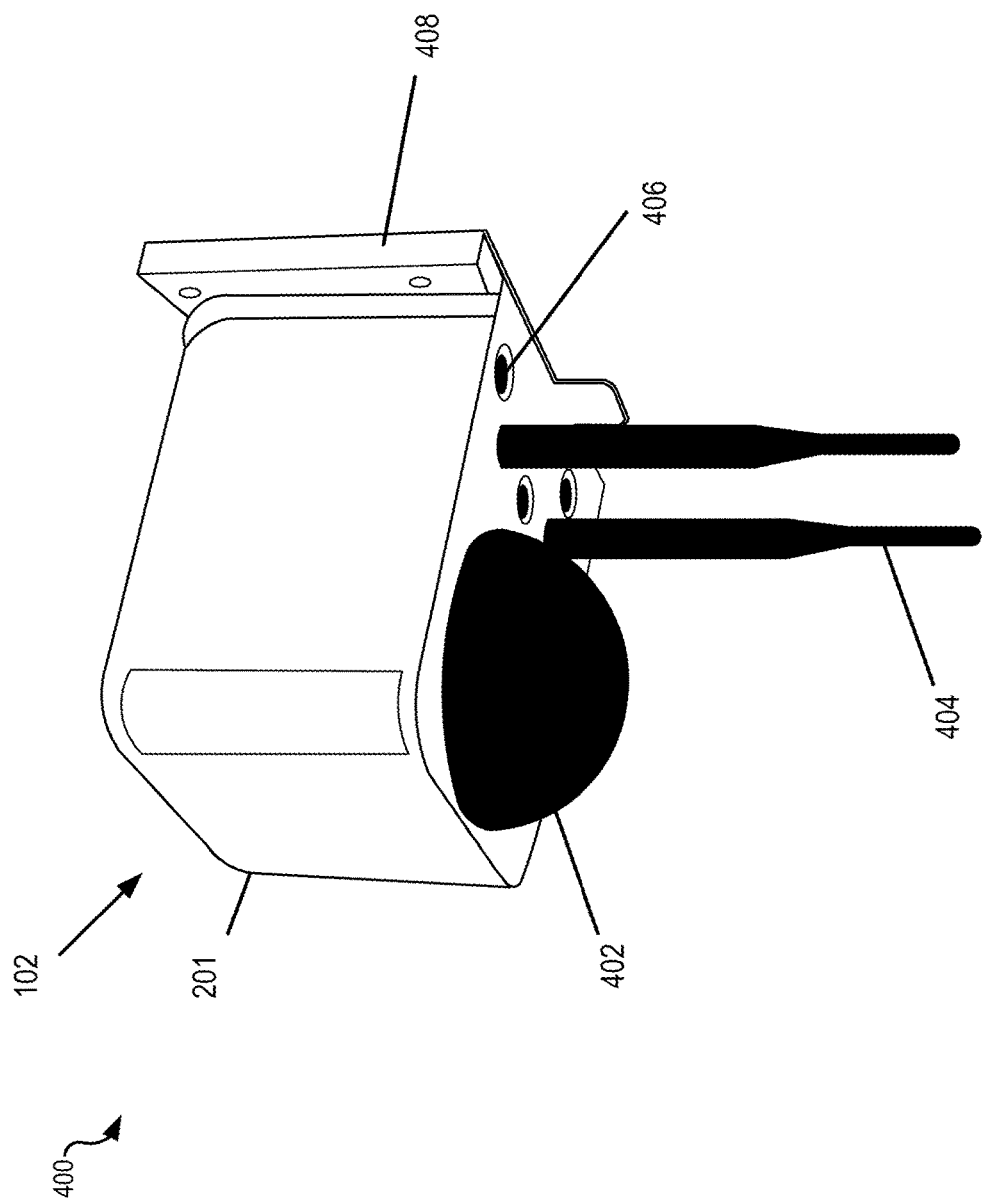
FIG. 4 illustrates a mobile roadway sensing unit, according to at least one example.

FIG. 4 is an illustrative commercial embodiment 400 of a mobile roadway sensing unit 102 according to at least one example. The mobile roadway sensing unit 102 can be housed in a housing 201. The mobile roadway sensing unit 102 can include a dome cover 402 for shielding an image sensor from the elements. The mobile roadway sensing unit 102 can also include one or more antennas 404 for communicatively coupling the mobile roadway sensing unit 102 to external electronic devices 140. In some examples, the mobile roadway sensing unit 102 can include one or more apertures 406 that can be sized to receive sensor components or other suitable components. The mobile roadway sensing unit 102 can include a mounting bracket 408 that can be used to fasten the mobile roadway sensing unit 102 to existing features of roadway architecture (e.g., traffic poles).

Figure 5:
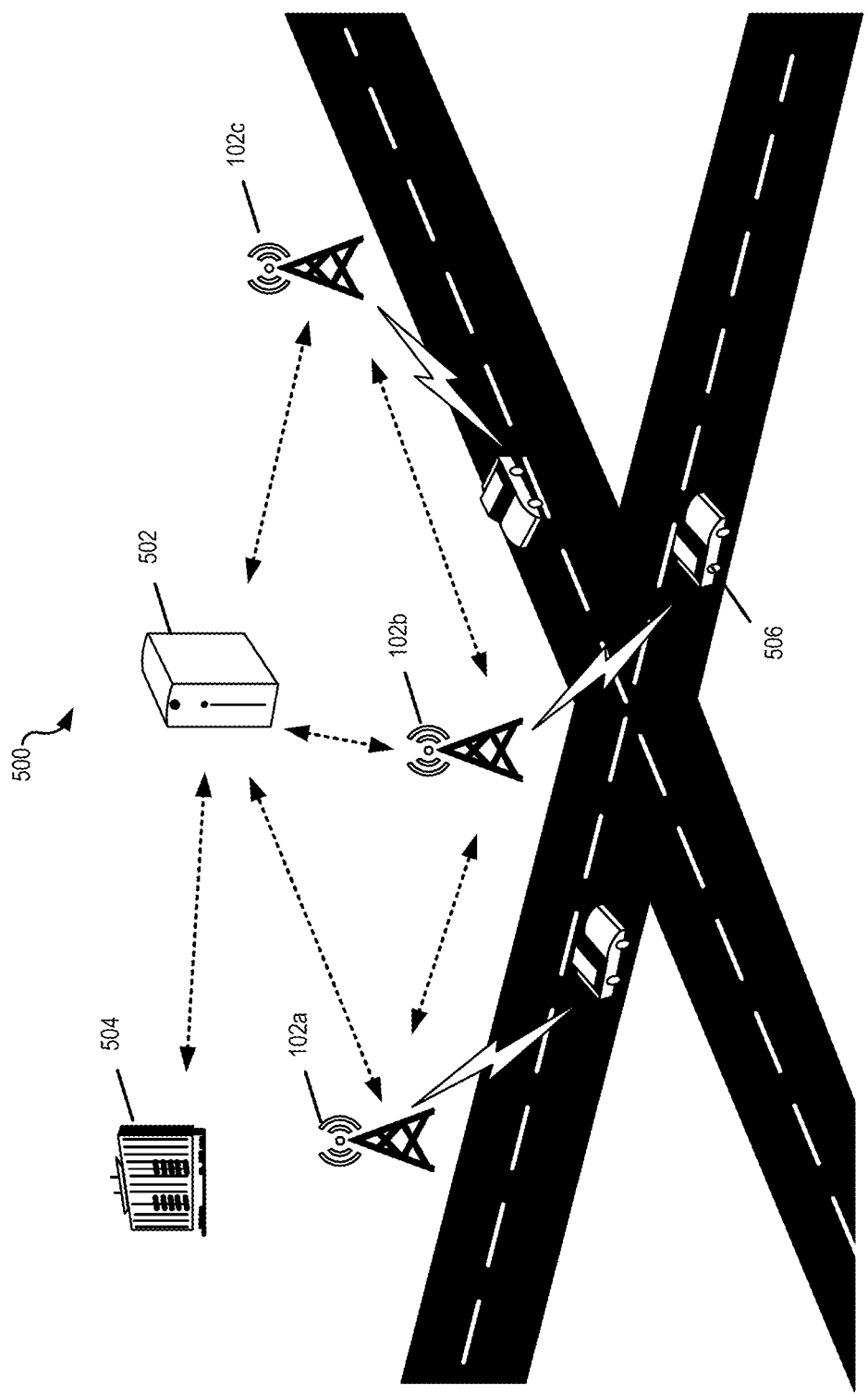
FIG. 5 is a diagram depicting a roadway infrastructure that includes mobile roadway sensing units, according to at least one example.

FIG. 5 is a diagram depicting a roadway infrastructure 500 that includes mobile roadway sensing units 102 according to at least one example. In some examples, mobile roadway sensing units 102a-c can be deployed to cover different sections of a road. The mobile roadway sensing units 102a-c can be communicatively coupled to each other for transmitting data. In an illustrative example, if the mobile roadway sensing unit 102c collects image data 111 that indicates that there has been a crash proximate to the mobile roadway sensing unit 102c, the mobile roadway sensing unit 102c can wirelessly transmit a notification 112 to the other mobile roadway sensing units 102a-b to enable the mobile roadway sensing units 102a-b to alert nearby road users of the danger. The mobile roadway sensing units 102a-c can communicate directly with vehicle electronics onboard vehicles 506. For example, the mobile roadway sensing units 102a-c may send and receive data via a V2X (Vehicle-to-Anything) protocol. The mobile roadway sensing units 102a-c can be communicatively coupled to a traffic management system 502, such as a server that can be used by a traffic management entity 504 to manage traffic infrastructure.

Figure 6:
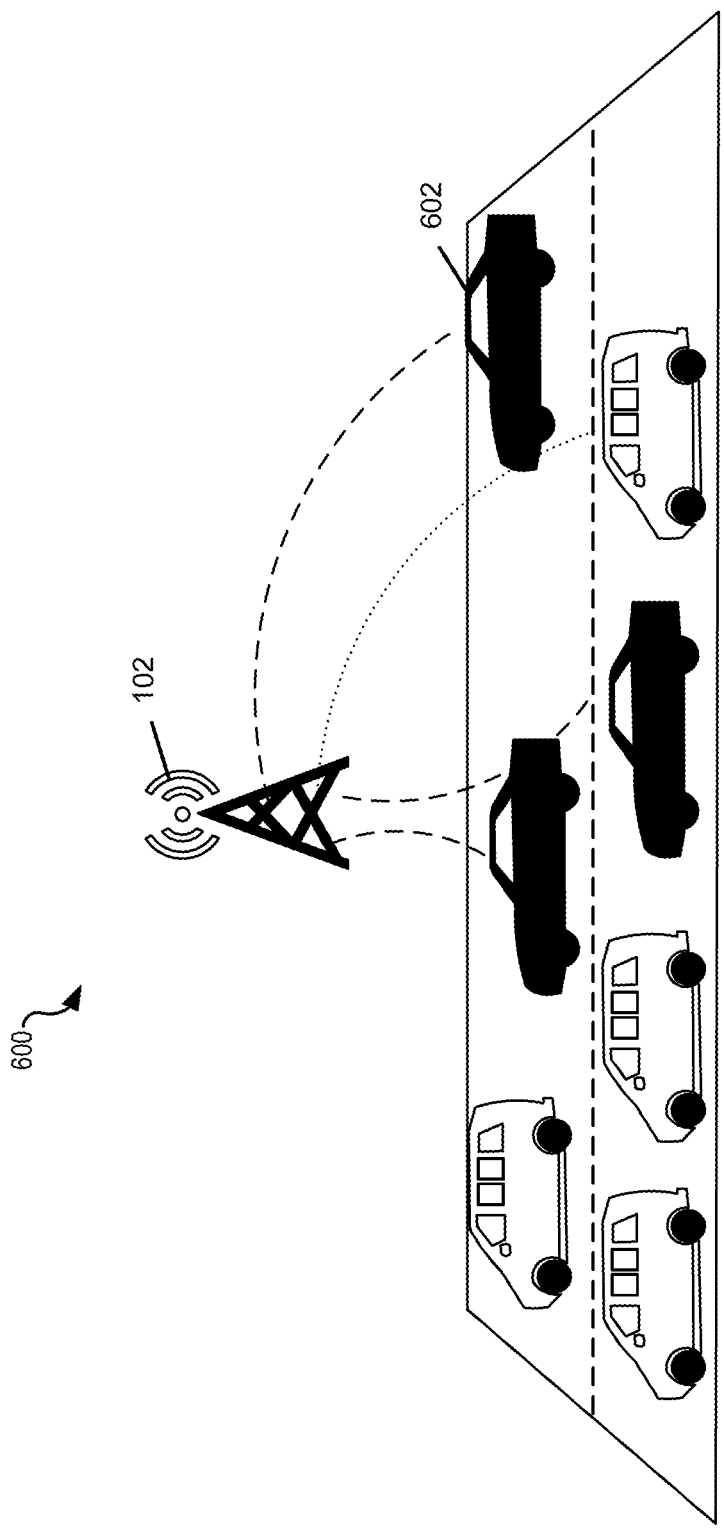
FIG. 6 is a diagram depicting a mobile roadway sensing unit proximate a roadway having a number of vehicles, according to at least one example.

FIG. 6 is a diagram depicting a mobile roadway sensing unit proximate a roadway 600 having a number of vehicles according to at least one example. The mobile roadway sensing unit 102 can estimate a density of road users based on a combination of image data 111 collected via an image sensor 107 onboard the mobile roadway sensing unit 102 and wireless signal data 113 collected from a network sensor 108 onboard the mobile roadway sensing unit 102. For example, the mobile roadway sensing unit 102 can implement a computer vision method to determine feature vectors corresponding to each vehicle 602 on the roadway. Based on the feature vectors, the mobile roadway sensing unit 102 can compute an estimate for the number of vehicles 602 on the road. Similarly, the mobile roadway sensing unit 102 can acquire wireless signal data 113 from the road users' external electronic devices 140 and, in some cases, the vehicles 602 themselves.

Figure 7:
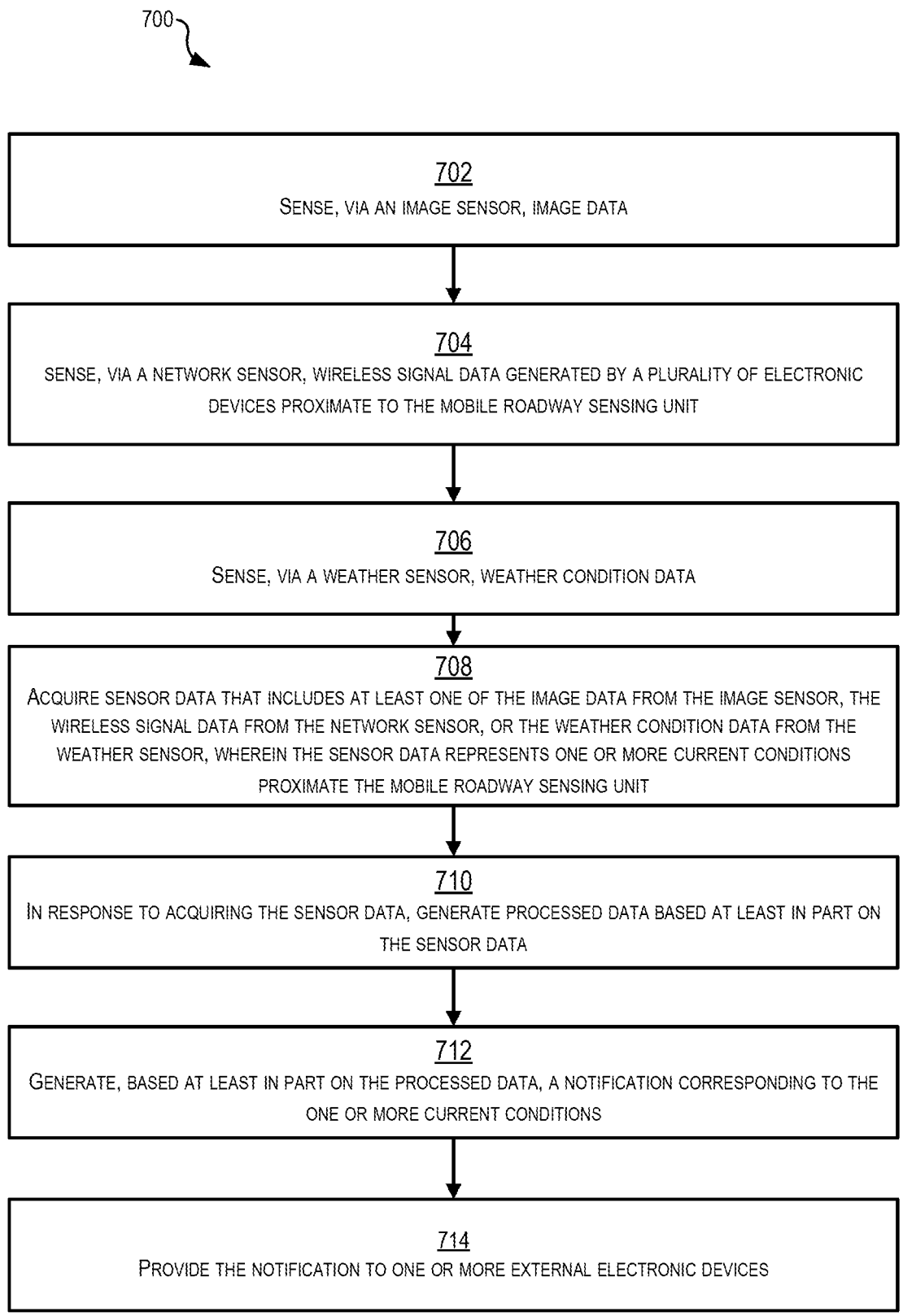
FIG. 7 is a flowchart depicting a process for using a mobile roadway sensing unit to transmit processed data to external electronic devices, according to at least one example.
Figure 8:
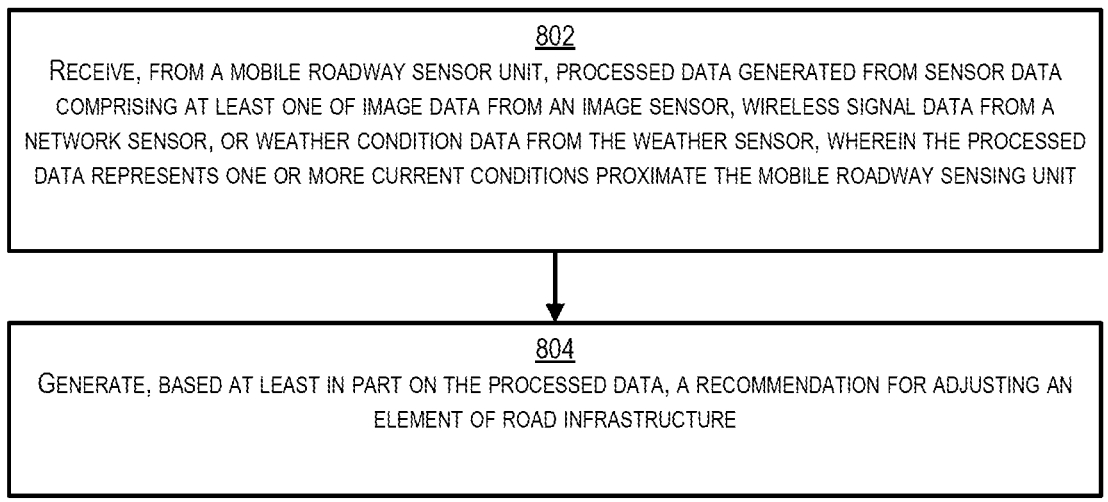
FIG. 8 is a flowchart depicting a process for using processed data from a mobile roadway sensing unit to adjust elements of traffic infrastructure, according to at least one example.

FIGS. 7-8 illustrate example flow diagrams showing processes 700 and 800, according to at least a few examples. These processes, and any other processes described herein (e.g., the process 100), are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

FIG. 7 illustrates an example flow chart depicting the process 700 for using a mobile roadway sensing unit 102 to transmit processed data 110 to external electronic devices 140. The process 700 is performed by the processor 202 (FIG. 2) executing in the mobile roadway sensing unit 102 (FIG. 1).

The process 700 begins at block 702 by the processor 202 sensing, via an image sensor, image data. The image data can be a video file, one or more image files, or any other suitable format for storing image data.

At block 704, the process 700 includes the processor 202, sensing via a network sensor, wireless signal data generated by a plurality of electronic devices proximate to the mobile roadway sensing unit 102.

At block 706, the process 700 includes the processor 202 sensing, via a weather sensor, weather condition data. The weather condition data can include a pressure, temperature, visibility, snow coverage, ice coverage, or any other suitable weather condition that pertains to the road.

At block 708, the process 700 includes the processor acquiring sensor data that includes at least one of the image data from the image sensor, the wireless signal data from the network sensor, or the weather condition data from the weather sensor, wherein the sensor data represents one or more current conditions proximate the mobile roadway sensing unit. In some examples, the current conditions can include the presence of an automobile crash in the roadway, a traffic density of the roadway, a number of pedestrians near the roadway, a visibility condition near the mobile roadway sensing unit, an average speed of vehicles on the roadway, a number of mobile devices present near the roadway, an amount of ice on the roadway, a snow coverage of the roadway, a temperature and/or humidity near the roadway, and/or a level of rainfall on the roadway.

At block 710, the process 700 includes the processor, in response to acquiring the sensor data, generating processed data 110 based at least in part on the sensor data. In some examples, the processed data 110 can require less storage space than the raw sensor data. For example, the processed data 110 can be compressed to a smaller file size prior to transmission via a compression algorithm.

At block 712, the process 700 includes the processor, generating, based at least in part on the processed data 110, a notification 112 corresponding to the one or more current conditions. The notification 112 can include one or more portions of the processed data 110. In some examples, the notification 112 can enable a traffic management server to adjust at least one element of traffic infrastructure.

At block 714, the process 700 includes the processor 202 providing the notification 112 to one or more external electronic devices 140. Providing the notification 112 to the external electronic devices 140 can involve communicating with the electronic devices 140 via Wi-Fi, Bluetooth, or any other suitable means of wireless communication. The one or more electronic devices 140 can include one or more vehicles on the roadway, or a traffic management system that is configured to manage a traffic infrastructure of the roadway.

FIG. 8 illustrates an example flow chart depicting the process 800 for using processed data from a mobile roadway sensing unit to adjust elements of traffic infrastructure, according to at least one example. The process 700 is performed by the traffic management system 502 (FIG. 5).

The process 800 begins at block 802 by the traffic management system 502 receiving, from a mobile roadway sensor unit, processed data generated from sensor data comprising at least one of image data from an image sensor, wireless signal data from a network sensor, or weather condition data from the weather sensor, wherein the processed data represents one or more current conditions proximate the mobile roadway sensing unit.

At block 804, the process 800 includes the traffic management system 502 generating, based at least in part on the processed data, a recommendation for adjusting an element of road infrastructure. For example, in response to receiving processed data indicative of adverse weather conditions on the roadway, the traffic management system 502 can generate a recommendation to deploy a road sign cautioning drivers of the adverse weather conditions.

Figure 9:
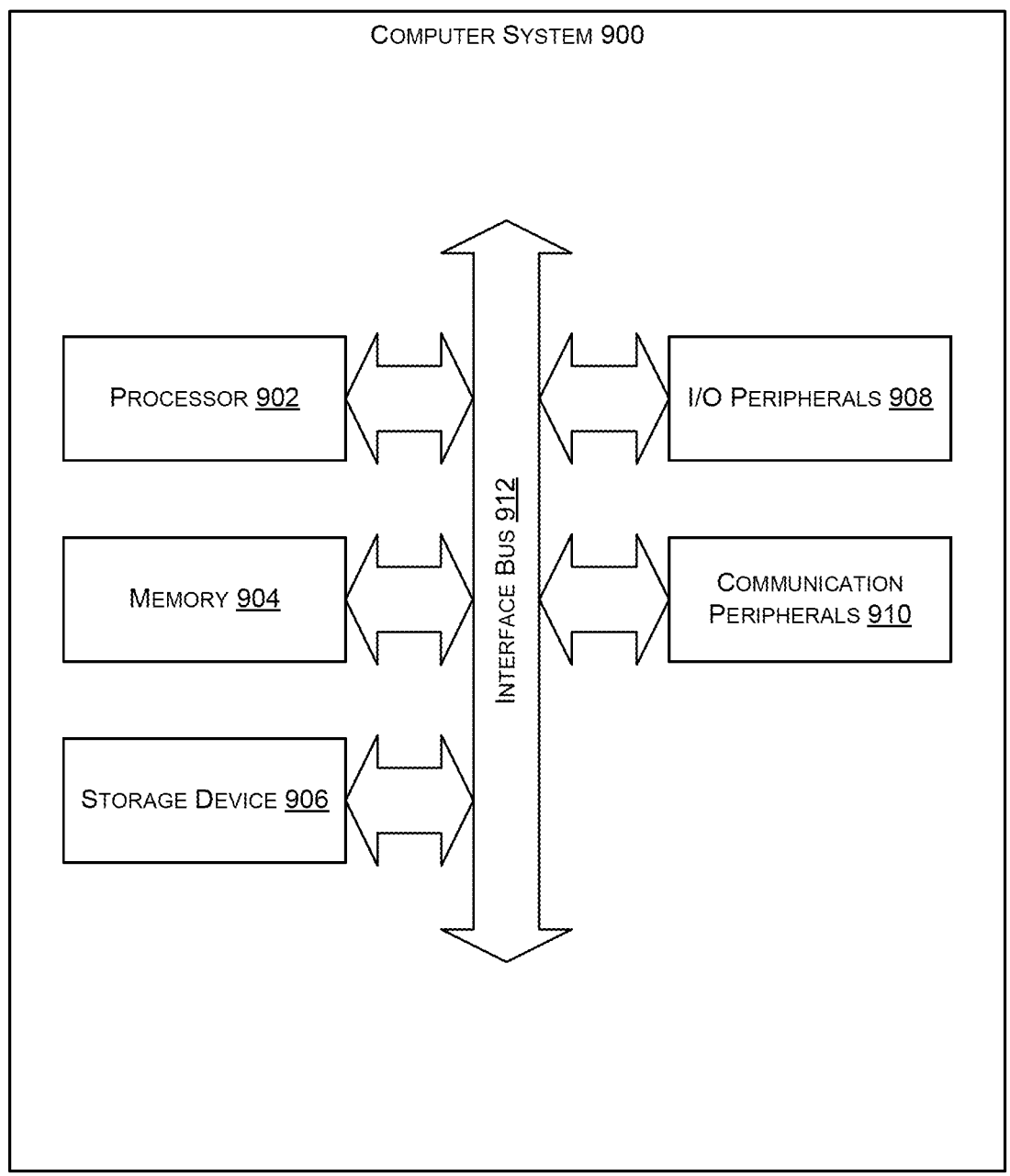
FIG. 9 is a block diagram of an example of a computing device that can be included in a mobile roadway sensing unit, according at least one example.

FIG. 9 illustrates example components of a computer system 900, in accordance with embodiments of the present disclosure. The computer system 900 can be used as a node in a computer network, where this node provides one or more computing components of an underlay network of the computer network and/or one or more computing components of an overlay network of the computer network. Additionally or alternatively, the components of the computer system 900 can be used in an endpoint. Although the components of the computer system 900 are illustrated as belonging to a same system, the computer system 900 can also be distributed (e.g., between multiple user devices). The computer system 900 can be an example of the mobile roadway sensing unit 102, the electronic devices 140, elements of the infrastructure management 332, and any other suitable electronic device described herein.

The computer system 900 includes at least a processor 902, a memory 904, a storage device 906, input/output peripherals (I/O) 908, communication peripherals 910, and an interface bus 912. The interface bus 912 is configured to communicate, transmit, and transfer data, controls, and commands among the various components of the computer system 900. The memory 904 and the storage device 906 include computer-readable storage media, such as RAM, ROM, electrically erasable programmable read-only memory (EEPROM), hard drives, CD-ROMs, optical storage devices, magnetic storage devices, electronic non-volatile computer storage; for example, Flash® memory, and other tangible storage media. Any of such computer-readable storage media can be configured to store instructions or program codes embodying aspects of the disclosure. The memory 904 and the storage device 906 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computer system of, for example, a cloud network or a data center. The I/O peripherals 908 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 908 are connected to the processor 902 through any of the ports coupled to the interface bus 912. The communication peripherals 910 are configured to facilitate communication between the computer system 900 and other systems over a communications network and include, for example, a network interface controller, modem, wireless and wired interface cards, antenna, and other communication peripherals The computer system 900 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random-access memory ("RAM") or read-only memory ("ROM"), as well as removable media devices, memory cards, and/or flash cards.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A mobile roadway sensing unit, comprising:
    an image sensor configured to sense image data;
    a network sensor configured to sense wireless signal data generated by a plurality of electronic devices proximate to the mobile roadway sensing unit;
    a weather sensor configured to sense weather condition data proximate to the mobile roadway sensing unit;
    a processor; and
    a memory comprising instructions that are executable by the processor for causing the processor to:
        acquire the image data from the image sensor, the wireless signal data from the network sensor, and the weather condition data from the weather sensor, wherein a combination of the image data, the wireless signal data, and the weather condition data represents a current condition proximate the mobile roadway sensing unit;
        in response to acquiring the image data, the wireless signal data, and the weather condition data, generate processed data;
        determine a portion of the processed data, the portion representing the current condition proximate the mobile roadway sensing unit;
        generate, based at least in part on the determining of the portion of the processed data, a notification corresponding to the current condition proximate the mobile roadway sensing unit; and
        provide the notification to one or more external electronic devices.

2. The mobile roadway sensing unit of claim 1, wherein the mobile roadway sensing unit further comprises:
    a housing that is positionable to partially encapsulate the image sensor, the network sensor, the weather sensor, the processor, and the memory, wherein the housing is configured to be mounted at a location proximate a roadway.

3. The mobile roadway sensing unit of claim 1, wherein the memory further comprises instructions executable by the processor for causing the processor to:
    wirelessly acquire a plurality of media access control addresses corresponding to a plurality of nearby electronic devices, wherein each electronic device of the plurality of nearby electronic devices communicates via at least one of Wi-Fi or Bluetooth;
    determine a number of nearby electronic devices based on the plurality of media access control addresses; and
    estimate a number of road users based on the number of nearby electronic devices.

4. The mobile roadway sensing unit of claim 1, wherein the memory further comprises instructions executable by the processor for causing the processor to generate the processed data substantially contemporaneously to acquiring the image data, the wireless signal data, and the weather condition data.

5. The mobile roadway sensing unit of claim 1, wherein the one or more external electronic devices comprises a traffic management server, and wherein the notification is configured to enable the traffic management server to adjust at least one element of traffic infrastructure.

6. The mobile roadway sensing unit of claim 1, wherein the current condition comprises a current condition of a roadway proximate the mobile roadway sensing unit, and wherein the one or more external electronic devices comprise one or more vehicles on or adjacent to the roadway.

7. The mobile roadway sensing unit of claim 1, wherein generating the processed data further comprises:
    removing identifying information from the image data; and
    subsequent to removing the identifying information from the image data, generating at least one feature vector from the image data, and wherein the notification generated based on the processed data is devoid of the identifying information.

8. The mobile roadway sensing unit of claim 1, wherein the memory further comprises instructions executable by the processor for causing the processor to:
    receive a response from at least one external device of the one or more external electronic devices; and
    based on the response, perform one or more operations, wherein the one or more operations comprises at least one of: updating the processed data based on the response, or adjusting a parameter of the mobile roadway sensing unit based on the response.

9. A computer-implemented method, comprising:
    sensing, by a processor of a mobile roadway sensing unit and via an image sensor of the mobile roadway sensing unit, image data;
    sensing, by the processor and via a network sensor of the mobile roadway sensing unit, wireless signal data generated by a plurality of electronic devices proximate to the mobile roadway sensing unit;
    sensing, by the processor and via a weather sensor of the mobile roadway sensing unit, weather condition data;
    acquiring, by the processor, the image data from the image sensor, the wireless signal data from the network sensor, and the weather condition data from the weather sensor, wherein a combination of the image data, the wireless signal data, and the weather condition data represents a current condition proximate the mobile roadway sensing unit;

in response to acquiring the image data, the wireless signal data, and the weather condition data and by the processor, generating processed data;

determining a portion of the processed data, the portion representing the current condition proximate the mobile roadway sensing unit;

generating, by the processor and based at least in part on the determining of the portion of the processed data, a notification corresponding to the current condition proximate the mobile roadway sensing unit; and providing, by the processor, the notification to one or more external electronic devices.

10. The computer-implemented method of claim 9, wherein the current condition comprises a presence of an automobile crash in a roadway proximate the mobile roadway sensing unit, and wherein the one or more external electronic devices comprise one or more vehicles on or adjacent to the roadway.

11. The computer-implemented method of claim 9, wherein the current condition comprises a traffic density of a roadway proximate the mobile roadway sensing unit, and wherein the one or more external electronic devices comprise one or more vehicles on or adjacent to the roadway.

12. The computer-implemented method of claim 9, wherein the current condition comprises a number of pedestrians proximate the mobile roadway sensing unit, and wherein the one or more external electronic devices comprise a traffic management system that is configured to manage a traffic infrastructure of the roadway.

13. The computer-implemented method of claim 9, wherein the current condition comprises a visibility condition proximate the mobile roadway sensing unit, and wherein the one or more external electronic devices comprise one or more vehicles on or adjacent to the roadway.

14. The computer-implemented method of claim 9, wherein the current condition comprises an average speed of vehicles that are travelling on a roadway proximate the mobile roadway sensing unit, and wherein the one or more external electronic devices comprise one or more vehicles on or adjacent to the roadway.

15. The computer-implemented method of claim 9, wherein the current condition comprises a number of mobile devices present proximate the mobile roadway sensing unit, and wherein the one or more external electronic devices comprise a traffic management system that is configured to manage a traffic infrastructure of the roadway.

16. The computer-implemented method of claim 9, wherein the current condition comprises an amount of ice on a roadway proximate the mobile roadway sensing unit, and wherein the one or more external electronic devices comprise one or more vehicles on or adjacent to the roadway.

17. One or more non-transitory computer-readable media comprising computer-executable instructions that, when executed by one or more processors of a mobile roadway sensing unit, cause the computing device to perform operations comprising:

sensing image data via an image sensor of the mobile roadway sensing unit;

sensing, via a network sensor configured to sense wireless signal data generated by a plurality of electronic devices proximate to the mobile roadway sensing unit;

sensing, via a weather sensor of the mobile roadway sensing unit, weather condition data;

acquiring sensor data that the image data from the image sensor, the wireless signal data from the network sensor, and the weather condition data from the weather sensor, wherein a combination of the image data, the wireless signal data, and the weather condition data represents a current condition proximate the mobile roadway sensing unit;

in response to acquiring the image data, the wireless signal data, and the weather condition data, generate processed data;

determine a portion of the processed data, the portion representing the current condition proximate the mobile roadway sensing unit;

generating based at least in part on the determining of the portion of the processed data, a notification corresponding to the current condition proximate the mobile roadway sensing unit; and providing the notification to one or more external electronic devices.

18. The one or more non-transitory computer-readable media of claim 17, wherein the current condition comprises a snow coverage of a roadway proximate the mobile roadway sensing unit, and wherein the one or more external electronic devices comprises a traffic management system and one or more vehicles on or adjacent to the roadway.

19. The one or more non-transitory computer-readable media of claim 17, wherein the current condition comprises a temperature and humidity near a roadway proximate the mobile roadway sensing unit, and wherein the one or more external electronic devices comprise a traffic management system and one or more vehicles on or adjacent to the roadway.

20. The one or more non-transitory computer-readable media of claim 17, wherein the current condition comprises a level of rainfall proximate the mobile roadway sensing unit, and wherein the one or more external electronic devices comprises a traffic management system and one or more vehicles on or adjacent to the roadway.

* * * * *